United States Patent [19]
Wittmann et al.

[11] 4,324,374
[45] Apr. 13, 1982

[54] INTEGRATED SPACECRAFT AND CRADLE STRUCTURE

[75] Inventors: Alois Wittmann, Rancho Palos Verdes; Charles P. Rubin, Santa Monica, both of Calif.

[73] Assignee: Hughes Aircraft Company, Culver City, Calif.

[21] Appl. No.: 140,555

[22] Filed: Apr. 15, 1980

Related U.S. Application Data

[63] Continuation of Ser. No. 910,912, May 30, 1978, abandoned.

[51] Int. Cl.³ .......................... B64G 1/14; B64G 1/64
[52] U.S. Cl. ................................. 244/158 R; 244/161
[58] Field of Search ............. 244/158, 159, 160, 161, 244/162, 118.1, 137 R; 410/48, 49; 248/133, 139, 346, 554, 555, 659, 671

[56] References Cited
U.S. PATENT DOCUMENTS

| 3,815,849 | 6/1974 | Meston | 244/160 |
| 4,043,524 | 8/1977 | Dreyer et al. | 244/158 |
| 4,044,974 | 8/1977 | Lingley et al. | 244/161 |
| 4,082,240 | 4/1978 | Heathman et al. | 244/161 |

OTHER PUBLICATIONS

"Analysis of Shuttle–Optimized DSCS111/Upper Stage Design", (SCG 60470R), Nov. 1976, pp. 6-1 to 6-6 and 6-20 to 6-25.
"Syncom 1V–Response to Announcement of Opportunity . . . ", (SCG 60496P), Dec. 1976, pp. 1-8 to 1-12.

Primary Examiner—Charles E. Frankfort
Attorney, Agent, or Firm—Noel B. Hammond; W. H. MacAllister

[57] ABSTRACT

A spacecraft specifically adapted for launch from the space shuttle by means of a cradle having locking and ejection mechanisms mounted therein. The cradle fastens into the payload bay of the space shuttle and returns therewith for reuse in subsequent launches. The spacecraft mounts at three points to the cradle, and the cradle mounts at three points to the shuttle such that a plane through the attachment points passes through the roll axis of the spacecraft at approximately the center of mass thereof. The cradle utilizes the truss structure of the spacecraft to produce the required stiffness by providing a structural tie between the two ends and the bottom of the cradle. At launch, the spacecraft is ejected with both linear and angular momentum, the spin providing gyroscopic stability. The locking mechanisms in the cradle can be remotely controlled to relock the spacecraft to the cradle in the event of an unsuccessful deployment attempt. The spacecraft includes a safety circuit employing acceleration sensing switches which sense spin-up of the spacecraft and prevent permature ignition of the perigee boost motor. The spacecraft has imbedded within its envelope a solid-propellant perigee boost motor surrounded by a liquid-propellant apogee motor. By employing apogee and perigee propulsion stages internal to the spacecraft, the storage length in the space shuttle is minimized, and the geometry and mass characteristics of the spacecraft make for a stable spinning vehicle during both the perigee and apogee boost phases.

1 Claim, 22 Drawing Figures

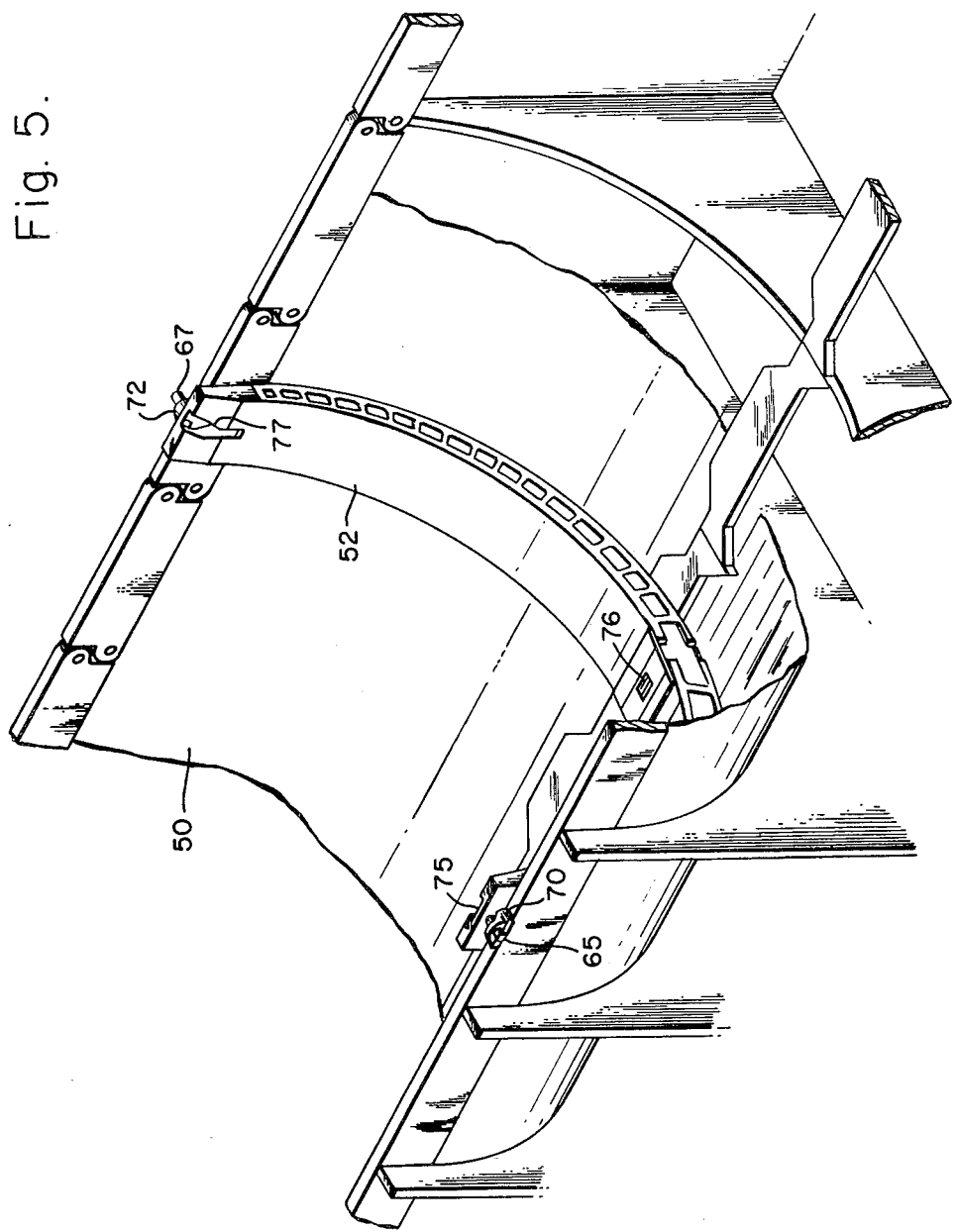

Fig. 9.
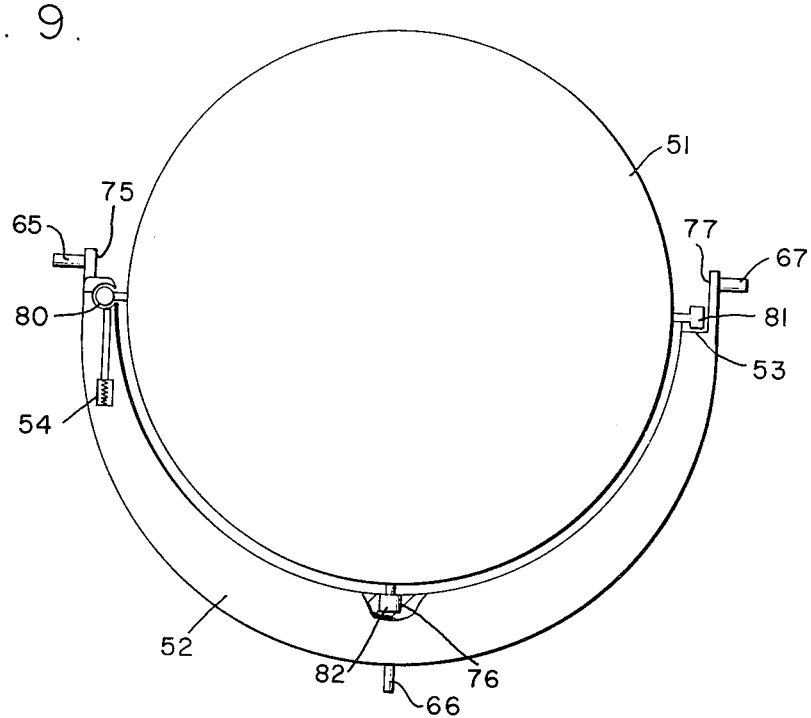
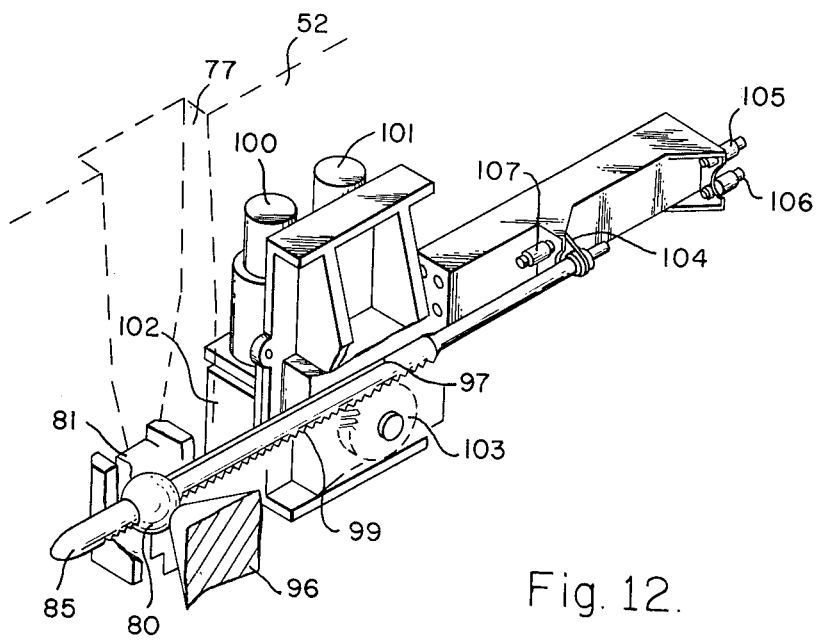
Fig. 12.

INTEGRATED SPACECRAFT AND CRADLE STRUCTURE

This is a continuation of application Ser. No. 910,912 filed May 30, 1978, now abandoned.

BACKGROUND OF THE INVENTION

Geostationary satellite systems have already demonstrated the ability to perform many communication, meteorological, and scientific missions when launched by expendable launch vehicles. The NASA Space Transportation System (STS), the Space Shuttle, offers the opportunity for a significant improvement in the performance and cost of satellites designed to take advantage of its capabilities. It therefore can make current applications more profitable and new uses economically attractive.

All satellite systems require launch vehicles, and all current launch vehicles are expended after delivering their spacecraft payload into orbit. The NASA Space Shuttle by contrast, introduces a new concept of being recoverable and reusable. Tests have proved that the Space Shuttle can be piloted like an airplane after re-entering the atmosphere from space.

All geostationary satellites so far have been launched by Thor Delta, Atlas Agena, Atlas Centaur, or Titan IIIC launch vehicles. Now, however, the spacecraft designer has the choice of six launch vehicles: Thor Delta (2914, 3914, 3910 PAM), N-Rocket, Atlas Centaur, Ariane, Titan IIIC, and the Space Transportation System. The N-Rocket is being developed by Japan's NASDA (National Space Development Agency) and the Ariane by Europe's ESA (European Space Agency). The United States plans to phase out the Thor Delta, Atlas Centaur, and Titan IIIC as the STS becomes operational in 1980. The returnable and reusable Space Shuttle offers the challenge and opportunity to geostationary spacecraft designers to make the best use of it.

The Space Shuttle will orbit Earth at a nominal 160 n.mi. with an orbit inclination of 28.6 deg when launched due east from Florida. A geostationary satellite must orbit at approximately 19,300 nautical miles north of the equator. The STS therefore needs an upper stage to launch geostationary satellites. The upper stage requirements are optimally satisfied by two propulsion impulses. At the time of an equatorial crossing, the first impulse imparts a velocity increment of approximately 8000 fps at the perigee of elliptical transfer orbit. At an appropriate apogee of the transfer orbit the second impulse imparts a velocity increment of 6000 fps, both circularizing the orbit and removing the inclination.

The central challenge in using the STS for the launch of geostationary satellites lies in finding the combination of upper stage and satellite geometry and functions that minimizes overall mission cost.

Upper-Stage Alternatives: The first upper-stage concepts considered for the STS completely separated orbit-injection functions from subsequent orbit-control requirements. These bulky and expensive "stand alone" upper stages obscure the basic economic advantages of the STS.

It soon became apparent that the STS could take advantage of the geostationary orbit-injection scheme pioneered by Syncom III in an historic Delta launch in 1964. This early capability was achieved by incorporating the apogee-boost motor within the satellite, thus permitting separation from the Delta at perigee injection. The perigee boost itself was provided primarily by the Delta's unguided, spinning upper stage. Since the apogee boost does not parallel the perigee boost, it was necessary to reorient the spacecraft spin axis before apogee-motor firing. This was done by the control and attitude sensing system required for Syncom's operational mission. The use of the satellite's telemetry and command system and communication repeaters to determine the transfer-orbit parameters via ground tracking permitted the selection of an apogee-motor firing time and attitude that minimized the effects of transfer-orbit injection errors. The subsequent launch of some 50 geostationary satellites by the Delta and Atlas Centaur boosters brought refinements but no basic changes to this technique.

NASA adopted the Spinning Solid Upper Stage (SSUS) as its preferred method of launching via the STS geostationary spacecraft previously designed for expendable launch vehicles. These upper stages are now known as SSUS-D for Delta and SSUS-A for Atlas Centaur replacements. The USAF has elected to retain the independent upper stage concept used in the Titan IIIC for its STS launches of spacecraft to high-energy orbits. It will use a pair of guided and controlled solid-propellant rocket stages known as the IUS (for Interim Upper Stage).

The STS/SSUS does offer a lower launch cost than the expendable launch vehicles for organizations unwilling or unable to depend exclusively on Space Shuttle operational availability. The accommodation of transition spacecraft in the Space Shuttle, while retaining their ability to be launched on expendable launch vehicles, has proven to be achievable. In the case of new spacecraft, the dual capability can readily be incorporated in the initial design.

Even for transition spacecraft, the STS reducer launch costs significantly. The STS economics clearly support the desirability of incorporating dual capability into transition spacecraft, permitting Space Shuttle launch while maintaining expendable-launch-vehicle backup.

The transition spacecraft, attractive as they are, do not represent optimum designs for the Space Shuttle, for two reasons. First the restriction on diameter imposed by the expendable launch vehicles makes them longer than otherwise necessary. The SSUS-D and SSUS-A configurations, for example, require a quarter, and a half, respectively, of the Space Shuttle payload bay volume, but use a much smaller fraction of the available weight. The dual compatibility thus levies a penalty of higher than necessary launch cost of the Space shuttle. As another disadvantage, such dual-launch spacecraft do not have as much space for mounting antennas, cameras, and scientific instruments as would one designed only for Shuttle launch.

Heretofore, spacecraft designed for launch from the space shuttle employ a cradle which provides its own stiffness. As a consequence, the currently designed cradles are extremely large and heavy. Furthermore, present cradles are not usable for large diameter spacecraft, since inadequate space is available due to the large size of the cradle.

OBJECTS OF THE INVENTION

Accordingly, it is an object of the present invention to provide a cradle for a shuttle-launched spacecraft which is small in size and light in weight.

Another object of the invention is the provision of a cradle for a shuttle-launched spacecraft which will accomodate a large diameter spacecraft.

SUMMARY OF THE INVENTION

A generally U-shaped cradle is provided which depends on the spacecraft structure to provide the required stiffness. By utilizing the spacecraft to augment the cradle stiffness, the cradle can be made sufficiently narrow to support a fourteen foot diameter spacecraft in the fifteen foot diameter payload bay of the space shuttle.

The U-shaped cradle is provided with three trunnions which mate with fittings on the shuttle. Two of the trunnions are fastened to the longerons on each side of the shuttle, and the bottom trunnion fastens to the keel of the shuttle. The fittings provide a moment-free attachment, and also a slip-joint in the radial directions. As a result, the U-shaped cradle is highly flexible when radial loads are applied at the longeron locations.

The spacecraft structure provides a structural tie between the two ends of the U-shaped cradle and the keel, which greatly increases the overall stiffness of the integrated spacecraft and cradle combination. The spacecraft frame is a truss structure which provides the load path continuity. Loads induced during launch or landing of the shuttle are transmitted through this structure to the cradle and then to the shuttle.

The same truss frame structure also forms the primary structure of the spacecraft and supports all the components mounted therein. Consequently, the spacecraft structure serves a dual purpose in that it both stiffens the cradle and provides the major load paths for the spacecraft itself.

BRIEF DESCRIPTION OF THE DRAWINGS

The invention, including its various objects, features, and advantages, may be more readily understood with reference to the following detailed description of an embodiment thereof, taken in conjunction with the accompanying drawings, wherein like reference numerals designate like structural elements, and in which

FIG. 5 is a perspective view of a portion of the payload bay of the space shuttle with the cradle mounted therein;

FIG. 9 is a schematic diagram of the spacecraft illustrating how it mates to the cradle;

FIG. 12 is a perspective view of the locking mechanism which drives the locking bolt that locks two of the satellite trunnion balls to the cradle;

FIGS. 13 and 14 are perspective views, while FIGS. 15 and 16 are side elevations taken at 90 degrees with respect to each other. FIGS. 13, 15 and 16 show the mechanism in the locked position, while FIG. 14 shows the mechanism in the released or unlocked position;

DETAILED DESCRIPTION

Figure 1:
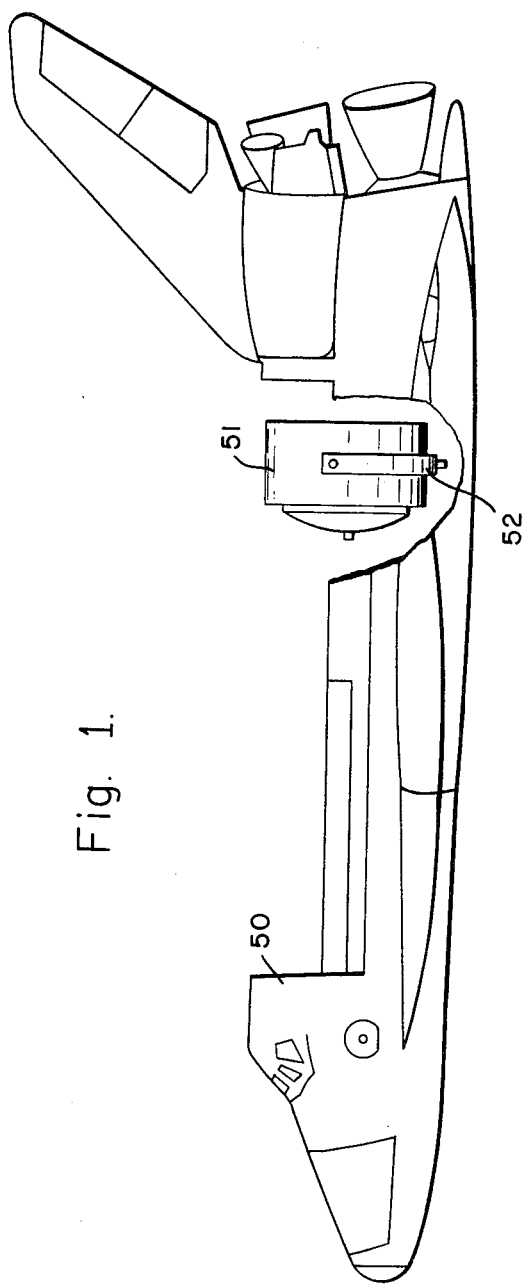
FIG. 1 is a drawing of a space shuttle showing the payload bay doors open, and having a portion broken away to show a spacecraft in a supporting cradle mounted therein.

Referring to FIG. 1 of the drawings, there is shown a space shuttle 50 developed by the National Aeronautics and Space Administration. The space shuttle 50 is shown with its payload bay doors open, and a portion is broken away to show a spacecraft 51 mounted in the payload bay by means of a cradle 52. The payload bay of the space shuttle 50 is 15 feet in diameter, 60 feet long, and carries 65,000 pounds. It has been calculated that a railroad box car can be loaded in the payload bay, and the doors can be closed.

The spacecraft 51 is designed to take advantage of the capabilities of the space shuttle 50, and in accordance with this optimized design, the length of the spacecraft 51 is nominally 10 feet and the diameter is made as large as possible, namely 14 feet. The cradle 52 mounts in the payload bay of the space shuttle 50 and simplifies the mechanical attachment of the spacecraft 51 to the space shuttle 50, as well as simplifying ground handling procedures. In addition, the cradle 52 provides the necessary locking and ejection mechanisms.

Figure 2:
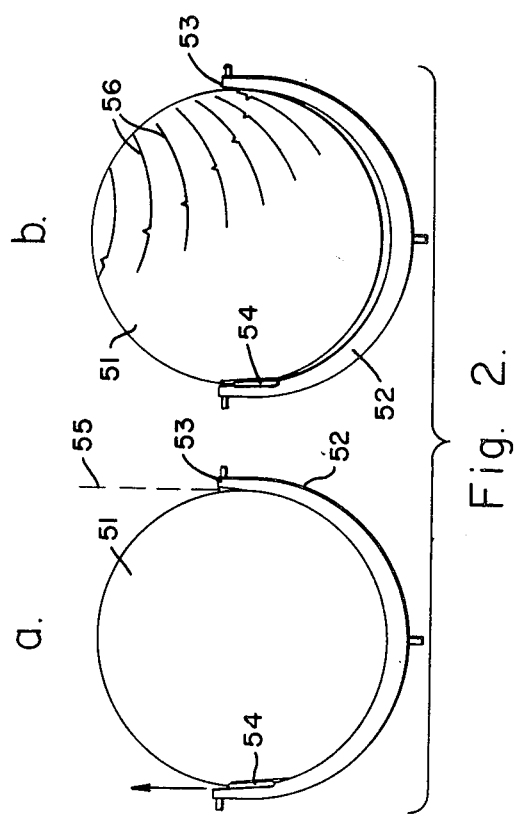
FIGS. 2a and 2b are diagrams illustrating the ejection of the spacecraft from the payload bay of the space shuttle.

The spacecraft 51 is stowed in the bay of the space shuttle 50 with the spin axis parallel to the roll axis of the shuttle 50. Thus, the attitude of the spacecraft 51 is set by the attitude of the shuttle 50 and is maintained during ejection by simultaneously imparting both linear and angular momentum to the spacecraft 51. The spin provides gyroscopic stabilization. FIG. 2a shows the spacecraft 51 before ejection. The cradle 52 provides a pivot point 53 at one side of the spacecraft 51 and provides an ejection spring 54 at the other side of the spacecraft 51. Both the spring 54 and the pivot point 53 lie in a plane normal to the spin axis and ideally, also passing through the center of mass of the spacecraft 51. Release of the ejection spring 54 causes the spacecraft 51 to rotate about the pivot point 53 creating a translation and rotation about the center of mass of the spacecraft 51. After the ejection force ceases, the free body motion of the spacecraft 51 is a rolling motion up a virtual or imaginary ramp 55, thus maintaining the imparted linear and angular momentum. The separation velocity and rotational speed depends on the inertia characteristics and diametric dimensions of the spacecraft 51, and on the ejection force and stroke length.

Figure 3:
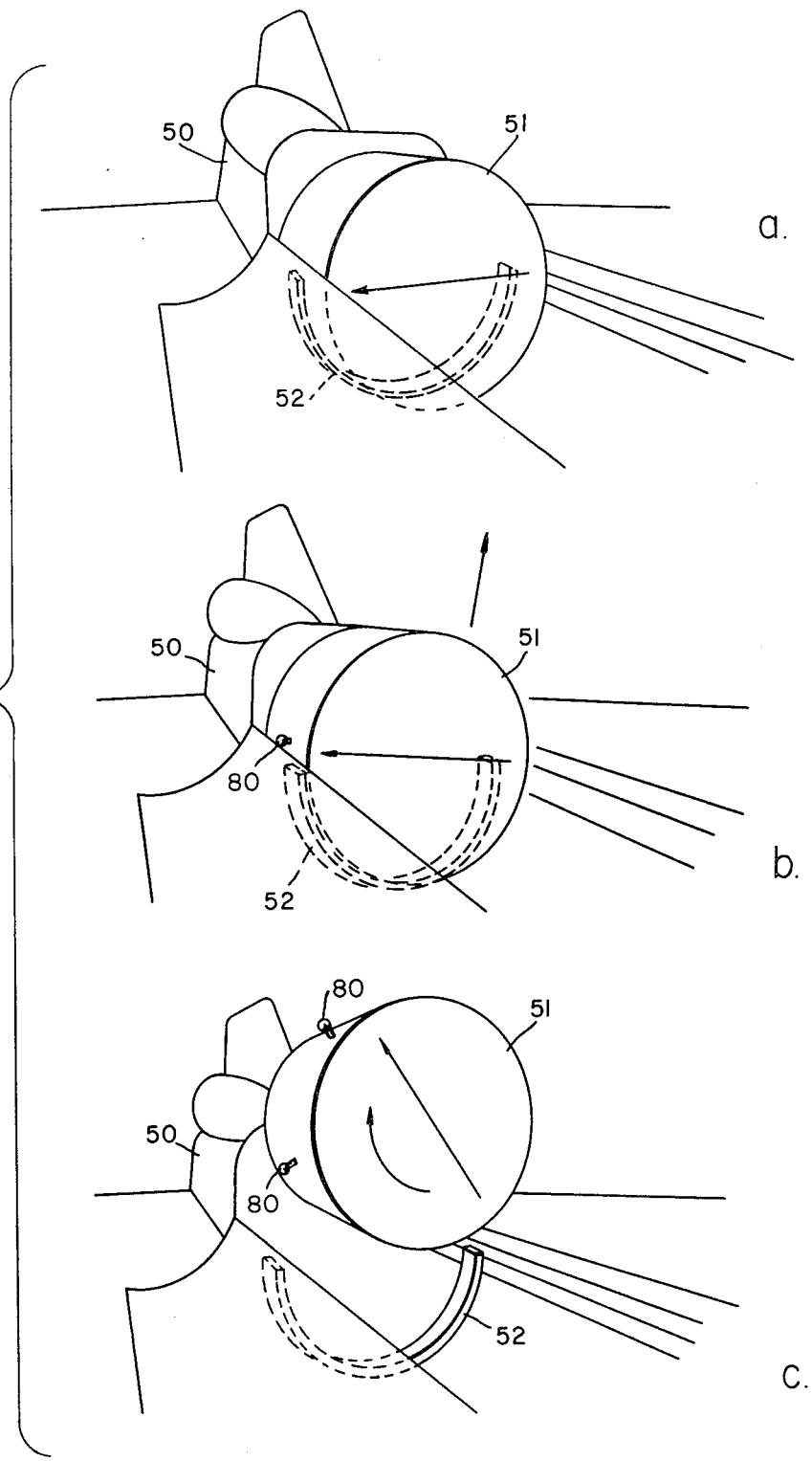
FIGS. 3a, 3b and 3c are diagrams which depict the motion of the spacecraft during ejection from the shuttle.

FIG. 2b shows the spacecraft 51 during ejection, the series of lines 56 indicating the motion of the spacecraft 51. The motion of the spacecraft 51 during ejection may be even more clearly seen from FIG. 3. FIG. 3a shows the spacecraft 51 before ejection, FIG. 3b shows the spacecraft 51 during ejection and FIG. 3c shows the spacecraft 51 after ejection. The arrows indicate the motion of the spacecraft 51, which motion may be on the order of 2-foot per second linear translation and two revolutions per minute.

Figure 4:
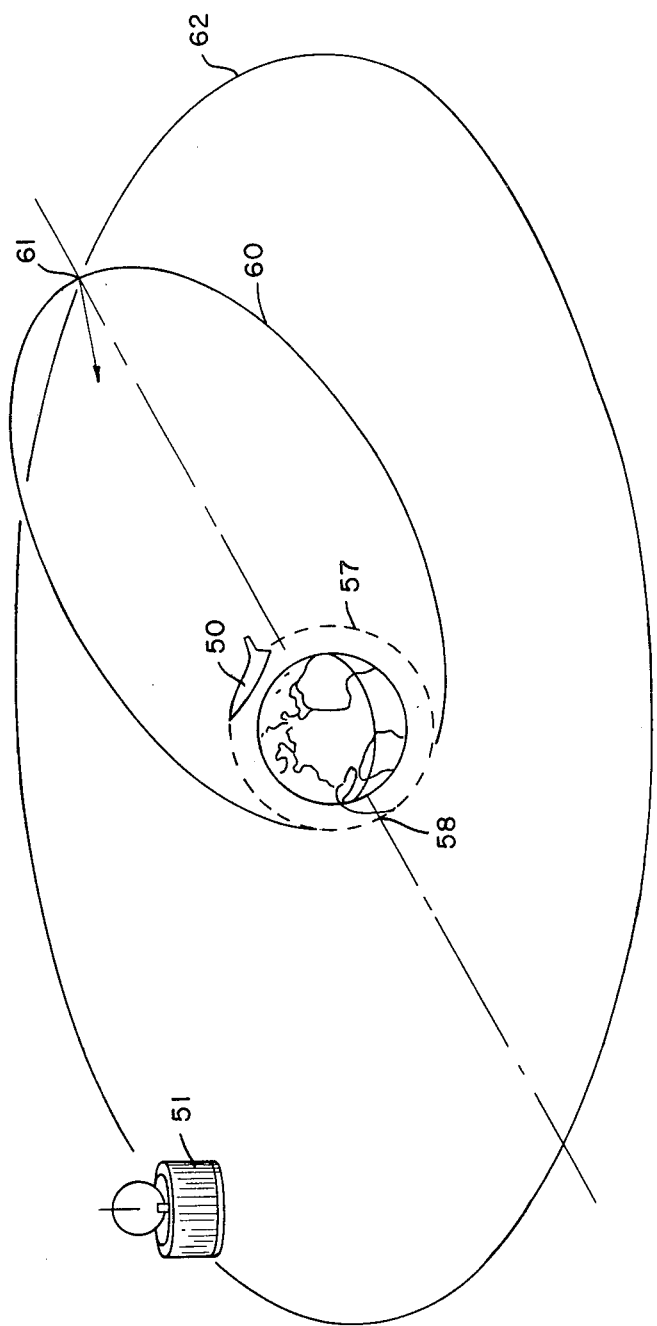
FIG. 4 is a diagram showing the relationship of the parking orbit of the space shuttle to the transfer orbit and synchronous orbit of the spacecraft.

Referring now to FIG. 4, the space shuttle 50 is designed to orbit the earth at a nominal 160 nautical miles with an orbit inclination of 28.6 degrees when launched due East from Kennedy Space Center at Cape Canaveral, Florida. This orbit is termed the parking orbit 57. To place the spacecraft 51 in geosynchronous orbit, a perigee kick motor is fired at the perigee 58 of a transfer orbit 60, and an apogee kick motor is fired at the apogee 61 of the transfer orbit 60, such that the spacecraft 51 is placed into the 19,300 nautical mile synchronous orbit 62.

The advantage of this type of ejection is that no active control of the spacecraft 51 is required prior to firing the perigee propulsion stage. Also, the ejection is accomplished by a simple mechanization which will be described more fully hereinafter. The spin of the spacecraft 51 provides gyroscopic stability although after the spacecraft 51 has been ejected, additional spin is imparted to it by spin-up jets. The gyroscopic stability helps to maintain adequate clearance as the spacecraft 51 leaves the payload bay of the shuttle 50. The spin of the spacecraft 51 insures propellant feed at the thrusters which are used subsequently for additional spin up. The U-shaped cradle 52 remains with the shuttle 50 after ejection of the spacecraft 51 and may be reused for subsequent launches.

FIG. 5 shows the cradle 52 mounted in the cargo bay of the space shuttle 50. The cradle 52 is provided with three trunnions 65, 66, 67, one at each side and one at the bottom. These trunnions 65, 66, 67 mate with fittings 70, 71, 72 located on the shuttle 50. Two of the trunnions 65, 67 are connected to longerons on each side of the shuttle 50, and the bottom trunnion 66 is connected to the keel of the shuttle 50. The fittings 70, 71, 72 provide a moment-free attachment and also a slip-joint in the radial directions. As a result, the U-shaped cradle 52 is highly flexible when radial loads are applied at the longeron locations.

Figure 6:
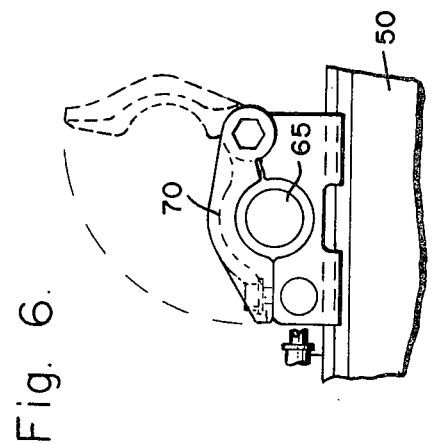
FIG. 6 is a side elevation view of one of the fittings which attaches the cradle to the payload bay of the space shuttle.

FIG. 6 shows in more detail one of the trunnions 65 fastened to the shuttle 50 by one of the fittings 70. The three-point attachment between the cradle 52 and the shuttle 50 provides a statically determinant (non-redundant) connection, thus eliminating loads into the spacecraft 51 induced by installation tolerances and by distortions of the shuttle 50 caused by either mechanical or thermal loading on the shuttle 50. These three attachment points lie in the same plane as the attachment points for the spacecraft 51. As will be seen in FIG. 5, slots 75, 76, 77 are provided in the cradle 52 for attachment of the spacecraft 51.

The three-point attachment between the spacecraft 51 and the cradle 52 represents the minimum number of release points and thus the fewest number of release mechanisms which must be actuated before ejection can occur. The plane formed by the attachment points passes through the longitudinal (or roll) axis of the spacecraft 51 at approximately the location of the center of mass of the spacecraft 51. This leads to favorable reductions in spacecraft loads and thus structural weight. This location is selected to reduce launch loads by eliminating the cantilever effect and to permit the cradle 52 to be the reaction platform for the push-off mechanism. The push off is accomplished by the ejection spring 54 with the spring force having zero longitudinal offset from the center of mass of the spacecraft 51.

The cradle 52 utilizes the structure of the spacecraft 51 to provide the required stiffness. In this way, it is possible to support a large diameter spacecraft 51 using a narrow U-shaped cradle 52. By utilizing the spacecraft 51 to augment the stiffness of cradle 52, the cradle 52 can be made sufficiently narrow to fit within the space between the spacecraft 51 and the 15 foot payload bay envelope. Thus, the weight of the cradle 52 is much less than if it had to be self-sustaining, and consequently more weight may be allotted to the spacecraft 51 for the same launch weight. The structure of the spacecraft 21 provides a structural tie between the two ends of the U-shaped cradle 52 and the keel, and this tie greatly increases the overall stiffness of the integrated system. In order to provide the required stiffness, the structure of the spacecraft 51 is designed as a truss structure which provides the load path continuity. The same structural elements also form the primary structure of the spacecraft 51 and support all major components such as the perigee motor, the propellant tanks and the remaining payload. Loads induced during launch or landing of the shuttle 52 are transmitted through this structure to the cradle 52 and then to the shuttle 50. Consequently, the structure of the spacecraft 51 serves a dual purpose in that it both stiffens the cradle 52 and provides the major load paths for the spacecraft 51 itself. The cradle 52 provides maximum capability for attaching a payload anywhere in the bay of the shuttle 50, and it is well-suited to all types of satellites such as spinners, gyrostats, and three axis spacecraft. Because the cradle 52 utilizes the structure of the spacecraft 51 to provide the required stiffness, the cradle 52 has a low weight and occupies a low volume, thus increasing available space for the spacecraft 51.

Figure 8:
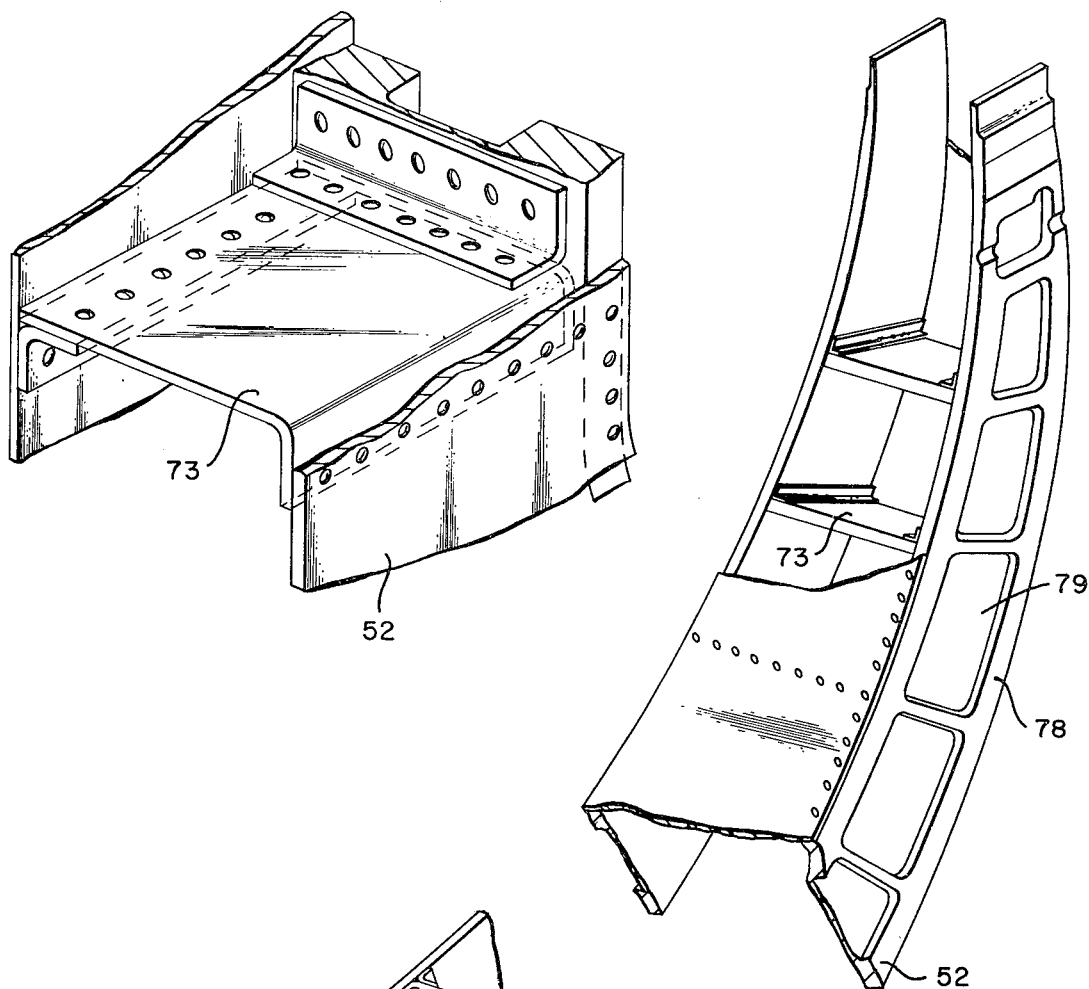
FIG. 8 is an enlarged perspective view of one of the bulkheads of the cradle.
Figure 7:
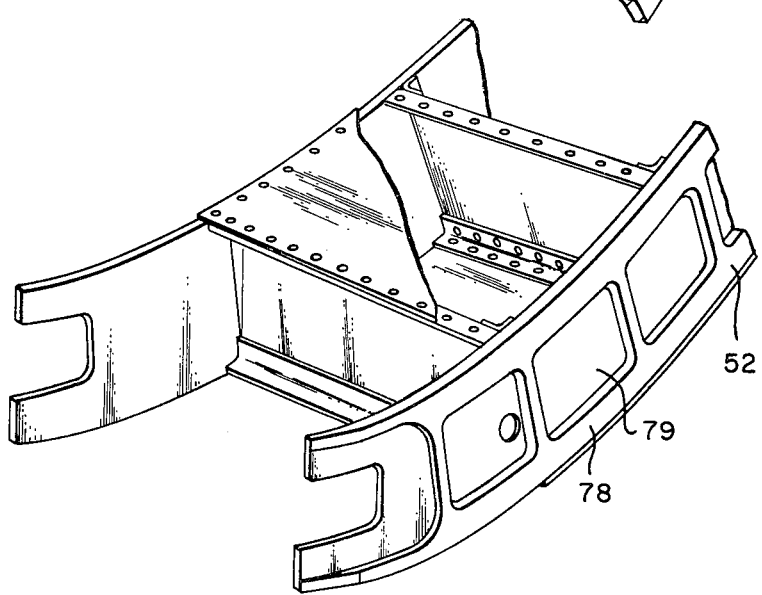
FIG. 7 is a perspective view of two segments of one side of the cradle, partly broken away, showing bulkhead, skin and sides.

As may be seen in FIGS. 7 and 8, the cradle 52 is made of many separate pieces of relatively thin-walled metal. FIG. 7 is a perspective view of two segments of one side of the cradle 52, showing bulkhead, skin and sides. FIG. 8 is an enlarged perspective view of one of the bulkheads 73 of the cradle 52. In effect, the cradle 52 comprises a series of individual hollow cells or compartments all joined together and covered with a skin. The side walls 78 are provided with hollowed portions 79 to reduce the weight. This structure is light and strong and occupies a low volume. At the attachment points for the trunnions 65, 66, 67, a heavier metal block is fastened to the compartmented structure.

Referring now to FIG. 9, the spacecraft 51 is provided with three trunnion balls 80 at the three attachment points. Two of the balls 80 located at the pivot point 53 and at the keel are provided with swivel blocks 81, 82, which are fastened around the balls 80 but are free to turn thereon. This arrangement forms a ball-and-socket joint. The swivel blocks 81, 82 slide into slots 76, 77 in the cradle. As will be more fully described hereinafter, the ball 80 at the pivot point 53 and the ball 80 at the keel are provided with holes through which a locking mechanism secures them to the cradle 52. The ball 80 located at the ejection spring 54 does not have a swivel block and mounts into a locking mechanism associated with the ejection spring 54. That ball 80 is provided with a concave depression to receive the end of a push rod from the ejection spring 54. The ejection spring 54 employs helical coil springs to drive the push rod.

Figure 10:
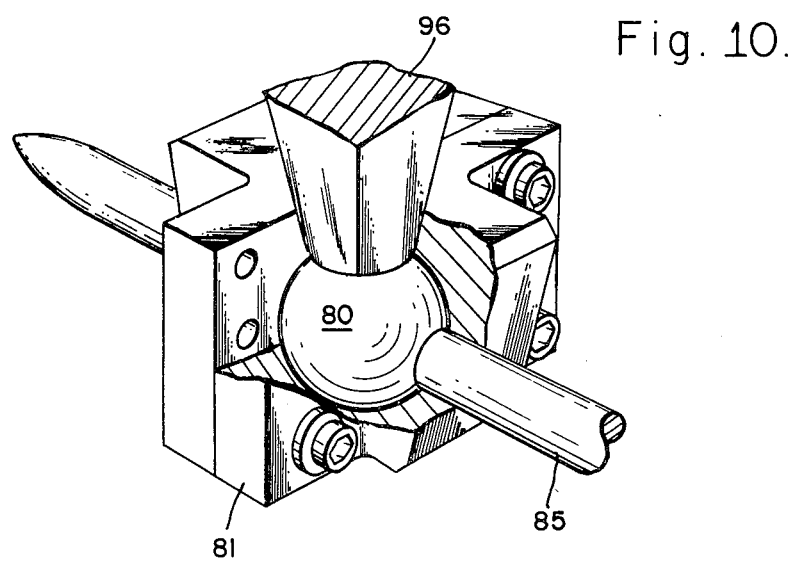
FIG. 10 shows a spacecraft trunnion ball in its swivel block illustrating how the ball is locked into the cradle by a locking bolt.

FIG. 10 shows a spacecraft trunnion ball 80 and its swivel block 81, illustrating how the ball 80 is locked into the cradle 52. The member 96 extending from the ball 80 to the spacecraft 51 is shown broken away. The ball 80 is provided with a hole through which a sliding locking bolt 85 passes. The locking bolt 85 is provided with a bullet-shaped nose to allow for misalignment between the cradle 52 and the spacecraft 51. Thus, even if thermal distortions due to differential thermal expansion or basic mechanical defects are present, the locking bolt 85 can lock the spacecraft 51 to the cradle 52.

A pair of bushings are provided in the cradle 52 to receive the locking bolt 85. The bushings are provided with tapered or wedged-shaped heads which protrude into the slot 77 in the cradle 52. The swivel block 81 is provided with a corresponding taper or wedge shape. The opening in the bushings is sized for a close fit to the locking bolt 85, whereas the opening in the ball 80 is oversize to allow for movement and swiveling of the swivel block 81 around the ball 80. This locking arrangement is provided at both the pivot point 53 in slot 77, and at the keel in slot 76.

Figure 11:
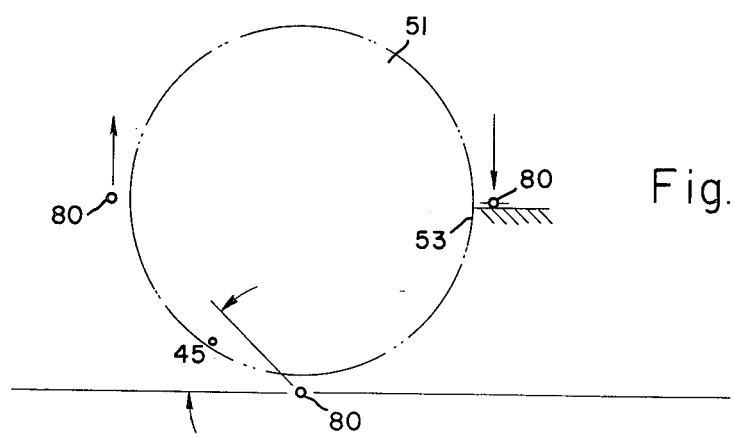
FIG. 11 is a schematic diagram illustrating the forces on the three satellite trunnion balls at the time of ejection.

At ejection, the spacecraft 51 applies a large downward force at the pivot point 53. This is illustrated in FIG. 11. The ball 80 at the bottom or keel attachment point leaves the cradle 52 at an angle of approximately 45 degrees.

FIG. 12 is a perspective view of the locking mechanism which drives the locking bolt 85. A pair of gearhead DC motors 100, 101 drive through a differential gear box 102 to a pinion gear 103 which engages rack teeth 99 provided along the bottom of the locking bolt 85. The locking bolt 85 is provided with a protrusion 104 which engages limit switches 105, 106, 107, 108 that control the extent of travel of the locking bolt 85. The limit switches 105, 106, 107, 108 are provided in pairs for reliability by way of redundancy. The locking bolt 85 is provided with a slot 97 along the top thereof which is engaged by a member rigidly fastened to the locking assembly. The member and slot 97 prevent the locking bolt 85 from rotating, and thus disengaging the pinion gear 103 from the rack teeth 99. This arrangement also limits the travel of the locking bolt 85. The differential gear box 102 allows either or both of the motors 100, 101 to insert or retract the locking bolt 85. Should one of the motors 100, 101 fail, the high drivetrain gearing allows the other one of the motors 100, 101 to drive the locking bolt 85 with the same axial force but at one-half the speed of both motors 100,101.

The locking mechanism has the capability to relock the spacecraft attachments following an unsuccessful deployment attempt if one of the release mechanisms fails to operate. Because the two permanent magnet DC motors 100, 101 are reversible, the locking bolt 85 may be inserted or withdrawn. The purpose of having the capability to relatch the spacecraft 51 to the shuttle 50 is to allow the shuttle 50 to land safely while bringing back the spacecraft 51 if the deployment is unsuccessful.

One advantage of this arrangement is that remote relatch capability precludes the requirement for extra vehicular activity, where an astronaut would have to enter the shuttle bay following an unsuccessful ejection attempt to perform one of the following operations: (1) manually relatch the spacecraft 51 to the shuttle 50 for safe return of the spacecraft 51 intact;(2) manually unlock all latches to allow the spacecraft 51 to be released for normal deployment or to be jettisoned to allow safe return of the shuttle 50. The deployment sequence allows for the locking bolt 85 to be retracted at all but the last spacecraft attachment point. Subsequently, a pyrotechnic device is fired, releasing the spacecraft 51. The sequence is such that if any failure occurs at any release point (including the pyrotechnic release point) all preceding latches can be relatched, thus securing the spacecraft 51 to the shuttle 50.

Figure 13:
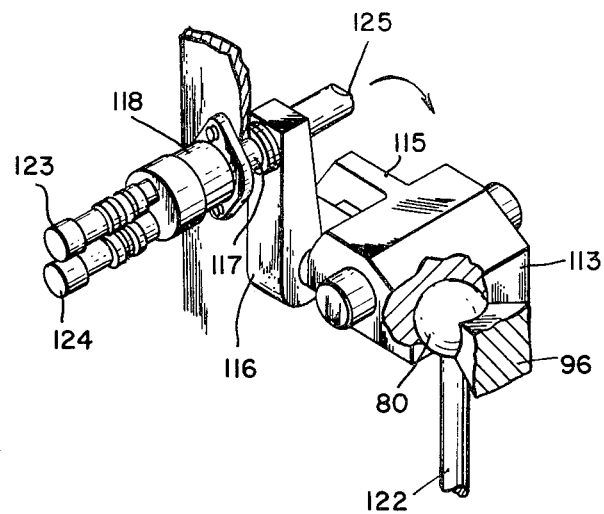
FIGS. 13, 14, 15 and 16 show the latching or locking mechanism used at the point where the ejection spring applies its force.
Figure 14:
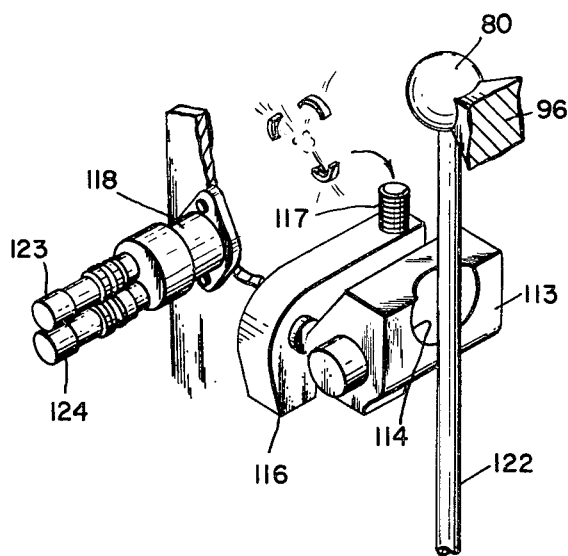
Figure 15:
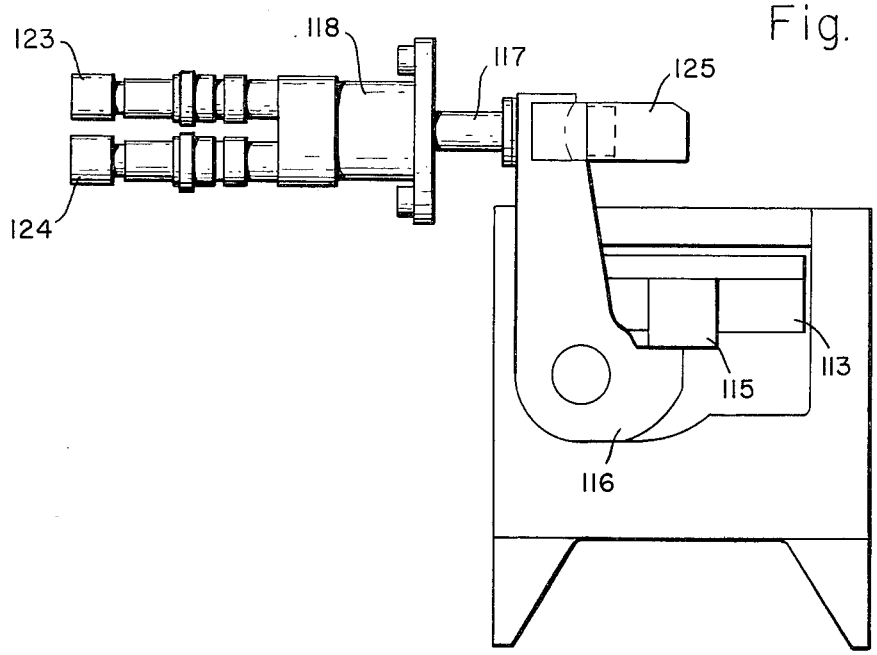
Figure 16:
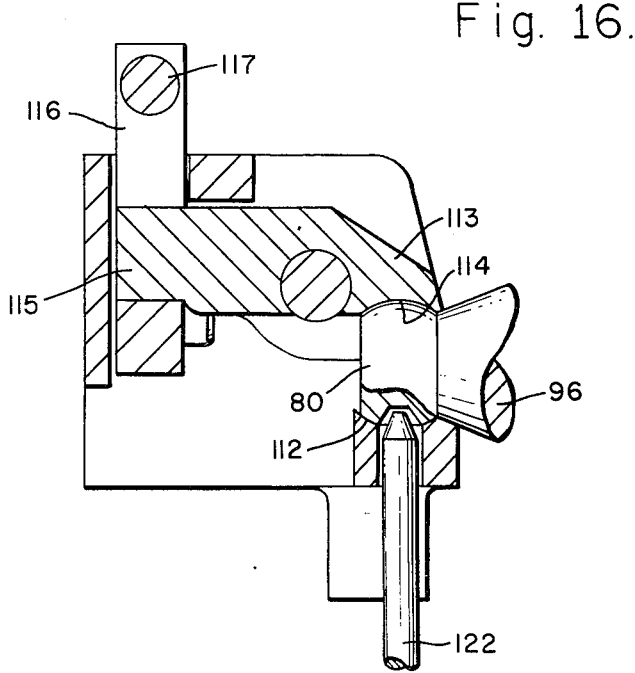

FIGS. 13, 14, 15, 16 show the latching mechanism used at the point where the ejection spring 54 applies its force. FIGS. 13 and 14 are perspective views and FIGS. 15 and 16 are side elevations taken at 90 degrees with respect to each other. FIG. 13 shows the mechanism in the locked position, while FIG. 14 shows the mechanism in the released or unlocked position. FIGS. 15 and 16 show the mechanism in the locked position. The trunnion ball 80 is rigidly fixed to the spacecraft 51 by the connecting member 96. The ball 80 is seated in a hemispherical seat 112 provided in the cradle 52, best seen in FIG. 16. A locking lever 113 is provided with a hemispherical hollow 114 which is clamped over the ball 80 locking it into the hemispherical seat 112. The combination of the hemispherical hollow 114, the hemispherical seat 112 and the ball 80 forms a ball-and-socket joint. The locking lever 113 has a latching member 115 which extends or protrudes therefrom and is engaged by a bellcrank 116 when the mechanism is in the locked or latched position. The bellcrank 116 is held in the locked position by a bolt 117 which is held by a separation nut 118. A pushrod 122 from the ejection spring 54 engages the bottom of the ball 80, a cavity or depression being provided therein for engagement with the end of the pushrod 122. The ejection spring 54 is cocked and exerts a force against the bottom of the ball 80.

The explosive separation nut 118 is of a well known or conventional type in which a nut in three sections is held together by a mechanism which is disengaged by the electrical firing of explosive squibs 123, 124. A pair of squibs 123, 124 is provided for reliability by way of redundancy. The firing of the explosive squibs 123, 124 causes the nut to separate into its three sections permitting the bolt 117 to fly out of the separation nut 118. The bolt 117 is caught in a hollow bolt catcher 125 which contains spring fingers to engage the head of the bolt 117, holding it captive. Upon release of the bolt 117, the bellcrank 116 is free to turn and no longer locks the latching member 115 of the locking lever 113. The force of the ejection spring 54 derives the pushrod 122 upward against the ball 80 causing the spacecraft 51 to pivot, resulting in ejection thereof.

Figure 17:
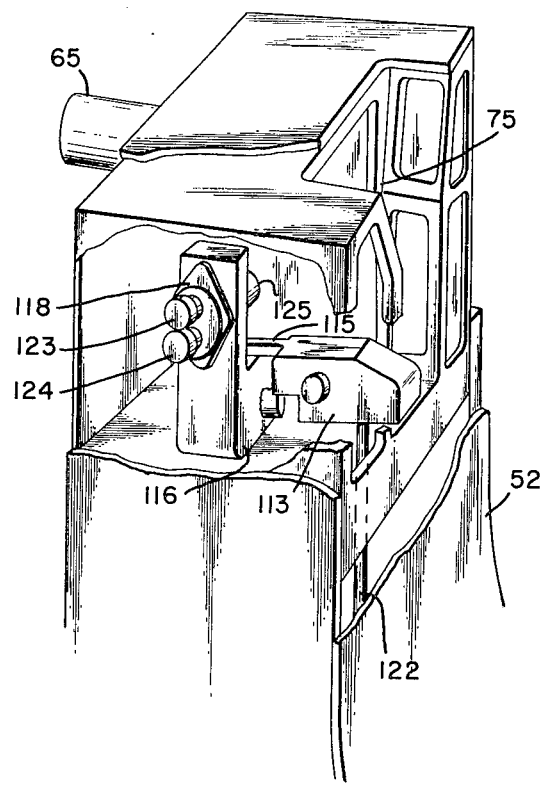
FIG. 17 shows the locking mechanism for the ejection spring mounted in the end of the cradle and protruding into the slot provided for the spacecraft trunnion ball.

FIG. 17 shows the locking mechanism for the ejection spring 54 mounted in the end of the cradle 52 and protruding into the slot 75 provided for the spacecraft trunnion ball 80. The pushrod 122 extends upward from the ejection spring 54, which is also mounted inside the cradle 52, but is not seen in this view.

Figure 18:
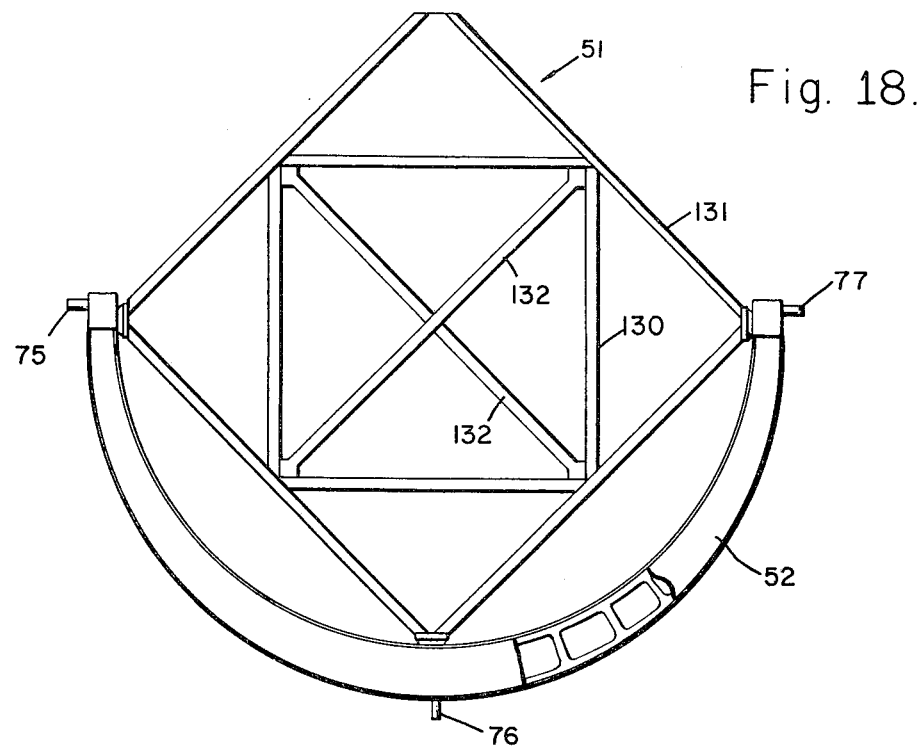
FIG. 18 shows the basic skeletal structure of the spacecraft illustrating how the truss structure of the spacecraft provides a structural tie between the two ends of the cradle and the bottom or keel point.

Referring now to FIG. 18, there is shown the basic skeletal structure of the spacecraft 51. As was pointed out hereinbefore, the integrated combination of the spacecraft 51 and the cradle 52 together provide the required stiffness in order to support a large diameter spacecraft 51 using a narrow U-shaped cradle 52. The structure of the spacecraft 51 provides a structural tie between the two ends of the U-shaped cradle 52 and the keel which greatly increases the overall stiffness of the combined structure. The structure of the spacecraft 51 is a truss structure which provides the load path continuity. The same structural elements also form the primary structure of the spacecraft 51 and support all major components. Loads induced during launch or landing of the shuttle 50 are transmitted through this structure to the cradle 52 and then to the shuttle 50. Thus, the structure of the spacecraft 51 serves a dual purpose in that it stiffens the cradle 52 and provides the major load paths for the spacecraft 51 itself.

As may be seen in FIG. 18, the truss structure is made of a small square frame 130 fastened within a larger square frame 131. Other frame members 132 tie the corners of the small square frame 130 to the center of the spacecraft 51.

Figure 19:
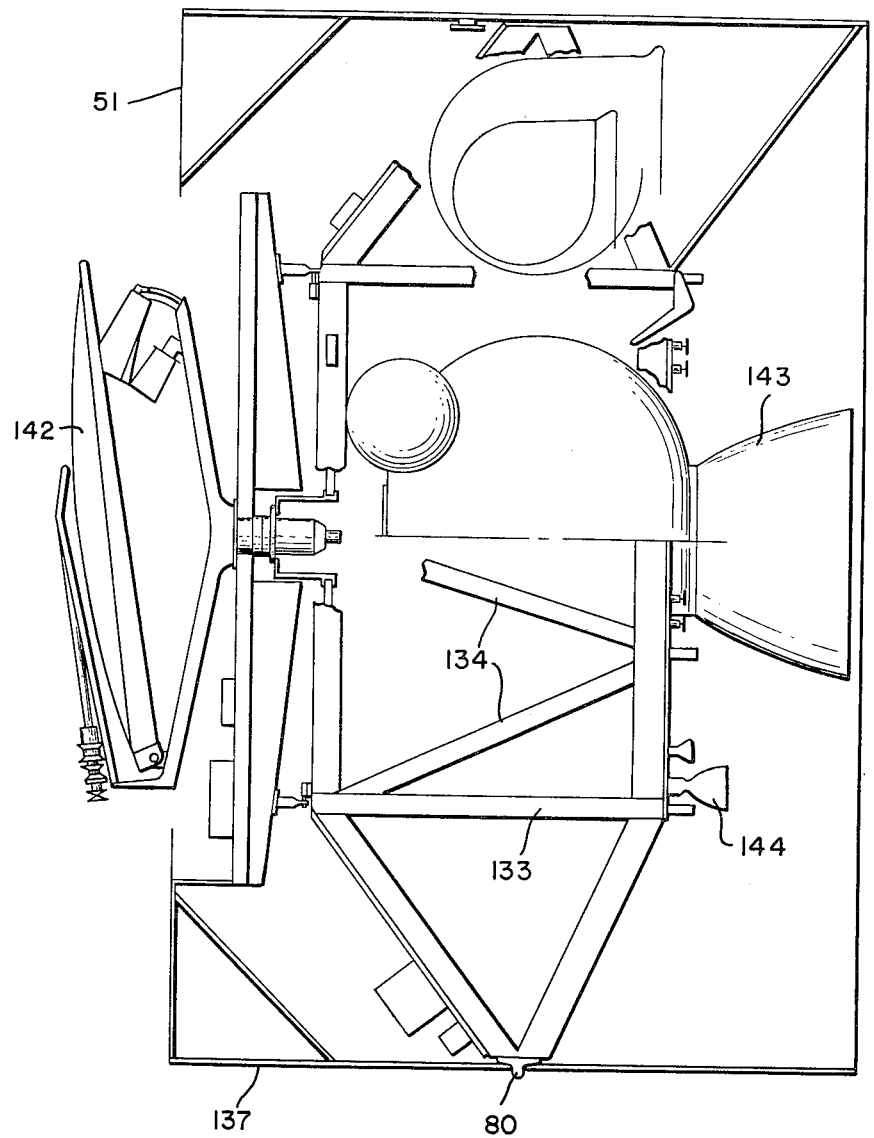
FIG. 19 is a side elevation of the spacecraft showing the truss frame structure in the axial direction.

Referring now to FIG. 19, it may be seen that in the other dimension, the truss structure of the spacecraft 51 is in the form of a rectangular frame 133 connected by frame members 134 which form a triangular or A-frame structure. It will be recognized that this overall structure is extremely strong and rigid, and that the three balls 80 which form the trunnions for the spacecraft 51 are rigidly interconnected.

Figure 20:
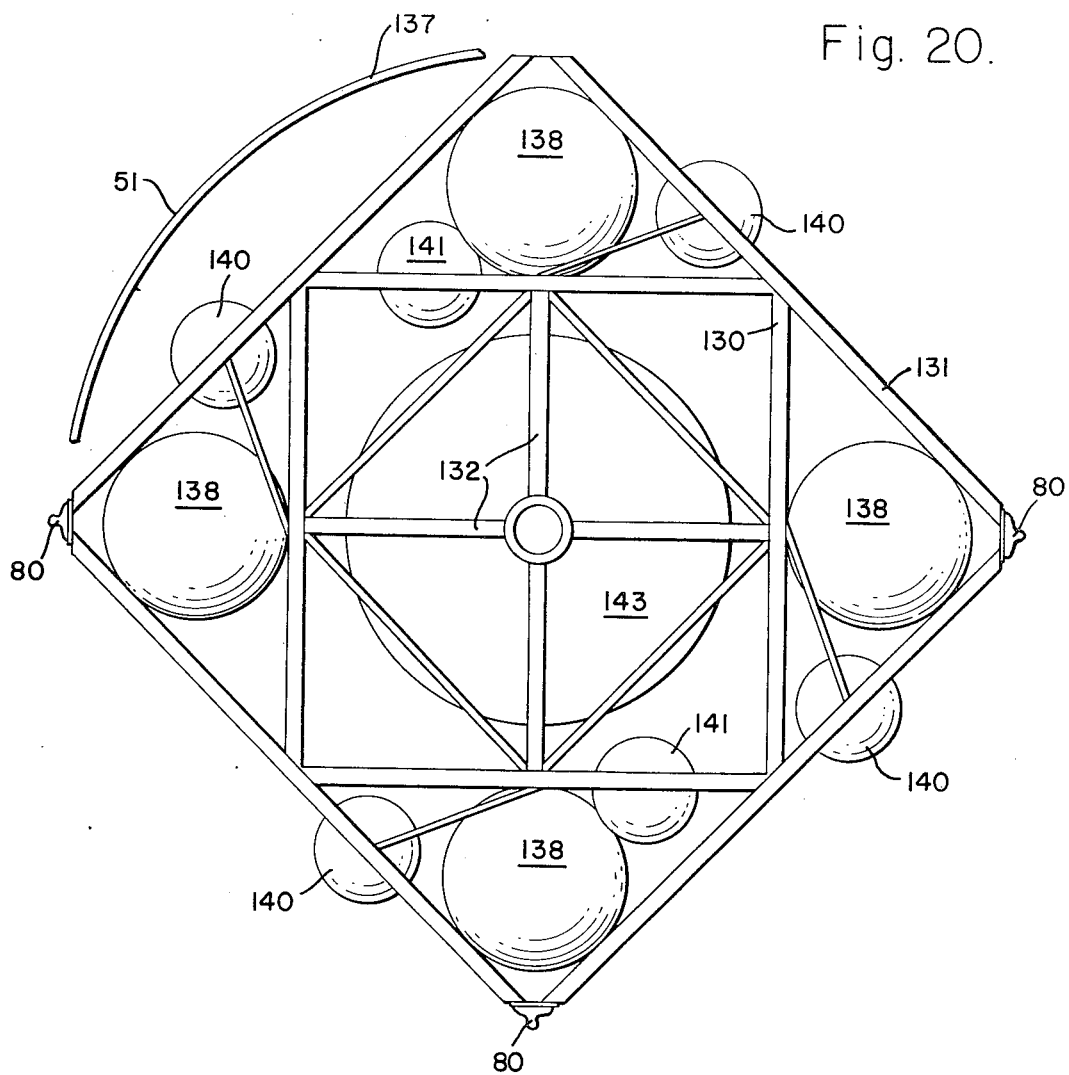
FIG. 20 is a top plan view of the spacecraft showing the frame structure, solar panel, propellant tanks and perigee motor.

A segment of the cylindrical solar panel 137 which forms the outer circumference of the spacecraft 51 is shown in FIG. 20. The frame structure supports four liquid apogee motor tanks 138. The frame also supports four hydrazine tanks 140 for the reaction control system of the satellite 51. In addition, there are two helium tanks 141. The antenna reflector 142 is shown in its folded down or stowed position.

As may be seen in FIGS. 19 and 20, the spacecraft 51 has imbedded within its envelope a solid-propellant perigee boost motor 143 surrounded by liquid-propellant apogee motor engines and nozzles 144. After the perigee boost motor 143 has been fired, it is ejected from the spacecraft 51. The arrangement of the perigee boost motor 143 imbedded in the center of the satellite 51 and surrounded by the liquid-propellant apogee motor engines and nozzles 144 is feasible due to the large diameter payload bay of the shuttle 50. By use of internal apogee and perigee propulsion stages, the required stowage length for the satellite 51 is minimized. This provides a compact spacecraft 51 which incorporates both the perigee and apogee propulsion stages within the normal envelope of the spacecraft 51 and in this way, minimizes the stowage length and the launch cost. Accordingly, multiple payloads can now be more easily stowed in the payload bay of the shuttle 50. The geometry and mass characteristics of this satellite 51 make it a stable spinning vehicle during both the perigee and apogee boost phases, thus no active nutation control is required. In conventional spacecraft, the perigee boost stages are attached in tandem to the exterior of the spacecraft and the result is a much longer configuration, and one that is inherently unstable because of the ratio of roll-to-pitch inertia being less than one, until after the perigee stage is separated from the spacecraft.

The basic spacecraft 51 is 14 feet in diameter with a 10-foot long cylindrical solar panel 137 which represents the controlling outer dimensions of the spacecraft 51. The perigee boost motor 143 is imbedded in the spacecraft with its thrust axis along the spin axis of the spacecraft 51. The aft end of the nozzle of the perigee kick motor 143 extends to the same location as the aft end of the solar panel 137, thus the perigee kick motor 143 adds no additional length to the spacecraft 51. The perigee kick motor 143 is attached to the main spacecraft frame by means of a conical structure.

Surrounding the perigee kick motor 143 are eight propellant tanks 138, 140, 141, four for the liquid apogee motor system, and four for the reaction control system which provides spin-up, reorientation and attitude control. The liquid apogee motor tanks 138 are larger in size and alternate in locations with the hydrazine tanks 140 for the reaction control system. The liquid apogee motor system includes two engine which are mounted aft and on each side of the perigee kick motor 143. Two engines are employed to minimize spacecraft coning during thrusting.

The communications payload of the spacecraft 51 is mounted on a Jespun platform which is mechanically locked until synchronous orbit is achieved. The despin bearing assembly is located forward of the top end of the perigee kick motor 143.

The basic layout of equipment is designed to produce a ratio of roll to pitch inertia greater than one to yield a stable, spinning spacecraft 51. The imbedding of the perigee boost motor 143 is a major factor in achieving this goal since it represents almost two-thids of the total weight. In the arrangement shown, the center of gravity of the perigee boost motor 143 is located nearly coincident with the overall center of gravity, thus greatly minimizing its contribution to the pitch inertia.

The design of the spacecraft 51 allows for separation of the perigee boost motor 143 and its support structure at the completion of the burn of the perigee boost motor 143. This separation is accomplished by means of pyrotechnic devices at the interfaces to the main structure. Separation of the burned-out perigee boost motor translates into additional payload weight which can be boosted to synchronous orbit by the liquid-propellant motor propulsion system.

Figure 21:
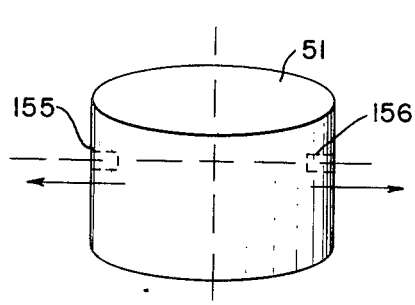
FIG. 21 is a perspective view of the spacecraft illustrating the orientation of the axes of acceleration sensing g-switches.
Figure 22:
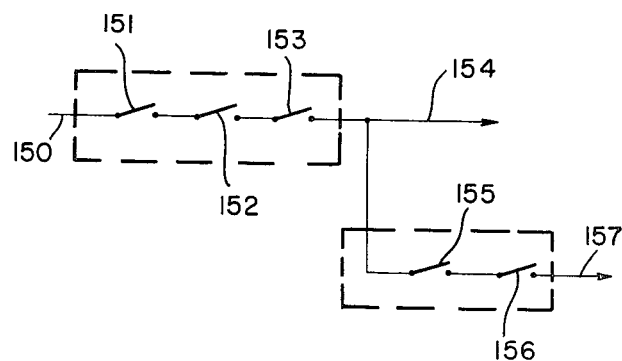
FIG. 22 is a circuit diagram showing the connection of the separation switches and the g-switches.

FIGS. 21 and 22 show a spin activated safety circuit for the spacecraft 51. If explosive or hazardous pyrotechnic devices were accidentally armed and fired while the spacecraft 51 is in the bay of the shuttle 50, the results could be catastrophic. A safety circuit has therefore been provided which prevents the arming and firing of these devices until the spacecraft 51 is ejected from the shuttle 50 and spins up to its normal perigee motor firing speed. Conventionally, a spacecraft employs separation switches to activate the enabling circuitry which arms and fires the motor. If a spacecraft should happen to be ejected only partially from the shuttle 50 and then become jammed, those separation switches could possibly close and activate the enabling circuitry causing it to arm and fire the motor.

Referring to FIG. 22, the spacecraft main power bus 150 is connected through three separation switches, 151, 152 and 153 which detect clearance between the spacecraft 51 and the cradle 52 which holds it in the shuttle 50. When an electrical path is completed through these switches 151, 152 and 153, power is applied to the bus 154 which is connected to timers that activate various spacecraft functions, including the firing of spin-up jets to impart rotational velocity to the spacecraft 51.

Two rotational acceleration sensors known as g-switches 155, 156 are mounted on opposite sides of the spacecraft 51 to sense the fact that the spacecraft 51 has indeed spun-up, and therefore must have separated from the shuttle 50. Only when a predetermined rotational speed is reached will the two g-switches 155, 156 close, allowing power to pass to the bus 157 which leads to the critical motor arm and fire circuits. Should any malfunction prior to this time cause arm or fire commands to be issued, they will be ignored. In this way, accidental premature ignition of the perigee kick motor 143 by electronic failures and ignition by the sequencer in the shuttle bay if the spacecraft should become jammed during ejection are both positively precluded. The sensing axes of the two g-switches 155 and 156 are oriented in opposing directions, thus the possibility of both switches 155, 156 closing simultaneously due to linear acceleration of the shuttle 50 is precluded.

In preparation for launch, the spacecraft 51 is placed in the cradle 52 by engaging the three satellite trunnion balls 80 in the slots 75, 76, 77 in the cradle 52. Two of the balls 80, the one at the pivot point 53 and the other at the keel point, are then locked in place by means of the locking bolts 85 driven by the DC motors 100,101. The third ball 80 at the ejection spring 54 is locked in place by engaging the locking lever 113 and the latching member 115 with the bell crank 116, and then fastening the bolt 117 into the separation nut 118. After the ball 80 is firmly locked in place, then the ejection spring 54 is cocked. With the satellite 51 firmly locked into the cradle 52, the assembly of the cradle 52 and satellite 51 is placed into the space shuttle 50 and the cradle trunnions 65, 66, 67 are locked by means of the fittings 70, 71, 72 so that the cradle 52 and satellite 51 are firmly mounted to the space shuttle 50.

After the shuttle 50 has reached the parking orbit 57 (FIG. 4), when it is desired to eject the spacecraft 41, first the locking bolt 85 at the pivot point 53 is retracted by operating the DC motors 100, 101, then the locking bolt 85 at the keel point is retracted and finally the separation nut 118 is fired which allows the ejection spring 54 to simultaneously impart translation and rotation to the spacecraft 51 for launch. The sequence is such that if any failure occurs at any release point, including the pyrotechnic release, all preceding locking bolts 85 can be relatched, thus securing the spacecraft 51 to the shuttle 50.

Thus, there has been described a spacecraft and mounting structure specifically designed to take advantage of launch from the payload bay of the NASA Space Shuttle. It is arranged for gyroscopic deployment with both spin and translational movement, has a three-point attachment to the shuttle and a three-point attachment between the spacecraft and the cradle, employs an integrated satellite and cradle structure in which the satellite provides strength to the cradle so that a smaller, lighter cradle may be used, and it has a locking mechanism for locking the spacecraft to the cradle which may be relocked if circumstances so dictate. The spacecraft employs a solid perigee kick motor internal to the spacecraft surrounded by the liquid apogee motor so as to provide a minimized stowage length and greater stability because of the ratio of roll to pitch inertia being less than one, and the satellite is provided with a spin-activated safety circuit which senses spacecraft spin-up, and therefore separation from the shuttle, before the arming of hazardous circuits.

It is to be understood that the above-described embodiment of the invention is merely illustrative of the many possible specific embodiments which represent applications of the principles of the present invention. Numerous and varied other arrangements can readily be devised in accordance with these principles by those skilled in the art without departing from the spirit and scope of the invention. For example, spring 54 could be replaced by a piston or tangential cable arrangement.

What is claimed is:

1. An integrated spacecraft and cradle assembly for supporting a spacecraft in the payload bay of a space shuttle comprising:
   a generally U-shaped cradle of a light and thin construction having two end portions and an intermediate section between said end portions;
   three trunnions projecting outwardly from said cradle, for mounting to the payload bay of the space shuttle, one at each of said end portions of the cradle and the third at said intermediate section;
   means providing three attachment points for a spacecraft within said cradle, one at each of said end portions and the third at said intermediate section;
   a spacecraft having three spacecraft trunnions around the periphery thereof, each pivotally engaging a corresponding one of said three attachment points of said cradle; and
   a spacecraft truss frame structure interconnecting said spacecraft trunnions which provides a structural tie between said two end portions of said U-shaped cradle and said intermediate section to stiffen said cradle, said spacecraft truss frame structure also supporting major components mounted within said spacecraft.

\* \* \* \* \*